United States Patent [19]

Tosi

[11] Patent Number: 4,893,697
[45] Date of Patent: Jan. 16, 1990

[54] INJECTION LUBRICATOR WITH PULSE COUNTER

[75] Inventor: Robert B. Tosi, Littleton, Colo.

[73] Assignee: Watts FluidAir Div. of Robert Shaw Controls Company, Kittery, Me.

[21] Appl. No.: 280,007

[22] Filed: Dec. 5, 1988

[51] Int. Cl.$^4$ ............................................. F16N 13/16
[52] U.S. Cl. ....................................... 184/7.4; 184/29; 184/39.1; 184/55.1
[58] Field of Search ......................... 184/29, 39.1, 55.1, 184/54, 7.4, 35, 6.14, 15.3, 71, 72; 417/510

[56] References Cited

U.S. PATENT DOCUMENTS

| | | | |
|---|---|---|---|
| 887,881 | 5/1908 | Watres | 184/29 |
| 2,546,585 | 3/1951 | Caldwell | 184/35 |
| 2,765,050 | 10/1956 | Klein et al. | 184/7.4 |
| 4,105,095 | 8/1978 | Thrasher, Jr. | 184/29 |
| 4,125,176 | 11/1978 | Thrasher, Jr. | 184/29 |
| 4,324,316 | 4/1982 | Thrasher, Jr. et al. | 184/29 |

*Primary Examiner*—Ira S. Lazarus
*Assistant Examiner*—Christopher Hayes
*Attorney, Agent, or Firm*—Fish & Richardson

[57] ABSTRACT

An injection lubricator including a lubricant pump having a pumping piston actuated by a pneumatic pulse to deliver a pulse of lubricant, a first rotatable counting member that provides a pneumatic pulse to the pump after a fixed number of incremental rotations of the first rotatable counting member, a second rotatable counting member that carries a displacement member that provides an incremental rotation of the first rotatable counting member after a plurality of incremental rotations of the second rotatable counting member, and a counting piston that is mounted within a piston chamber to receive pneumatic pulses and to provide an incremental rotation of the second rotatable counting member upon receiving each pneumatic pulse.

23 Claims, 3 Drawing Sheets

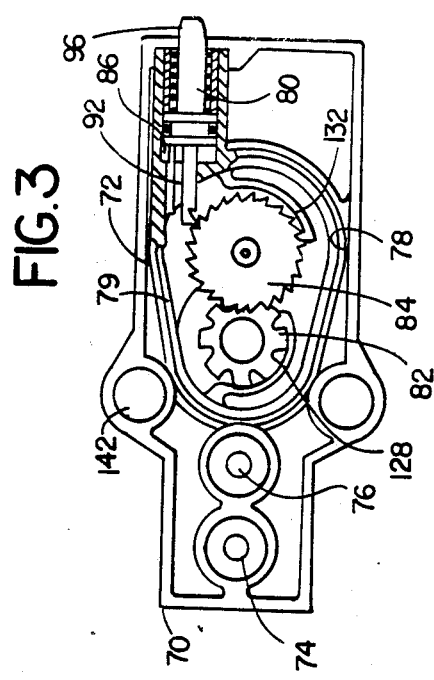
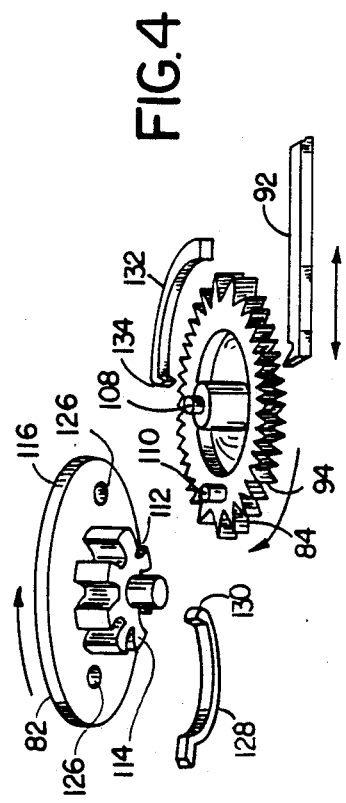
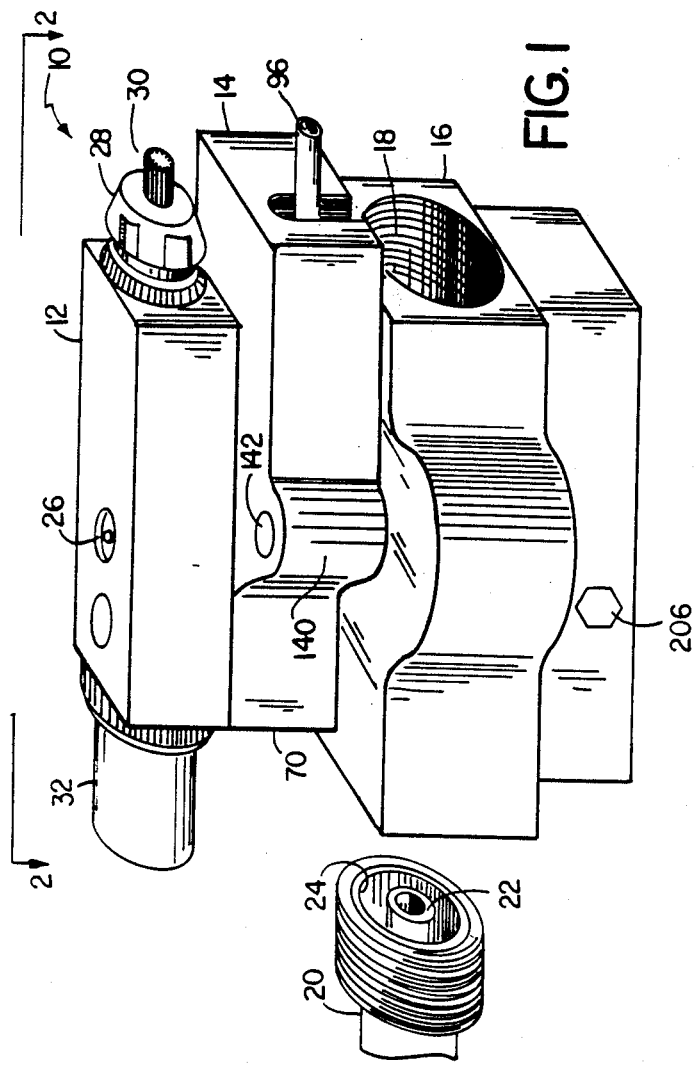

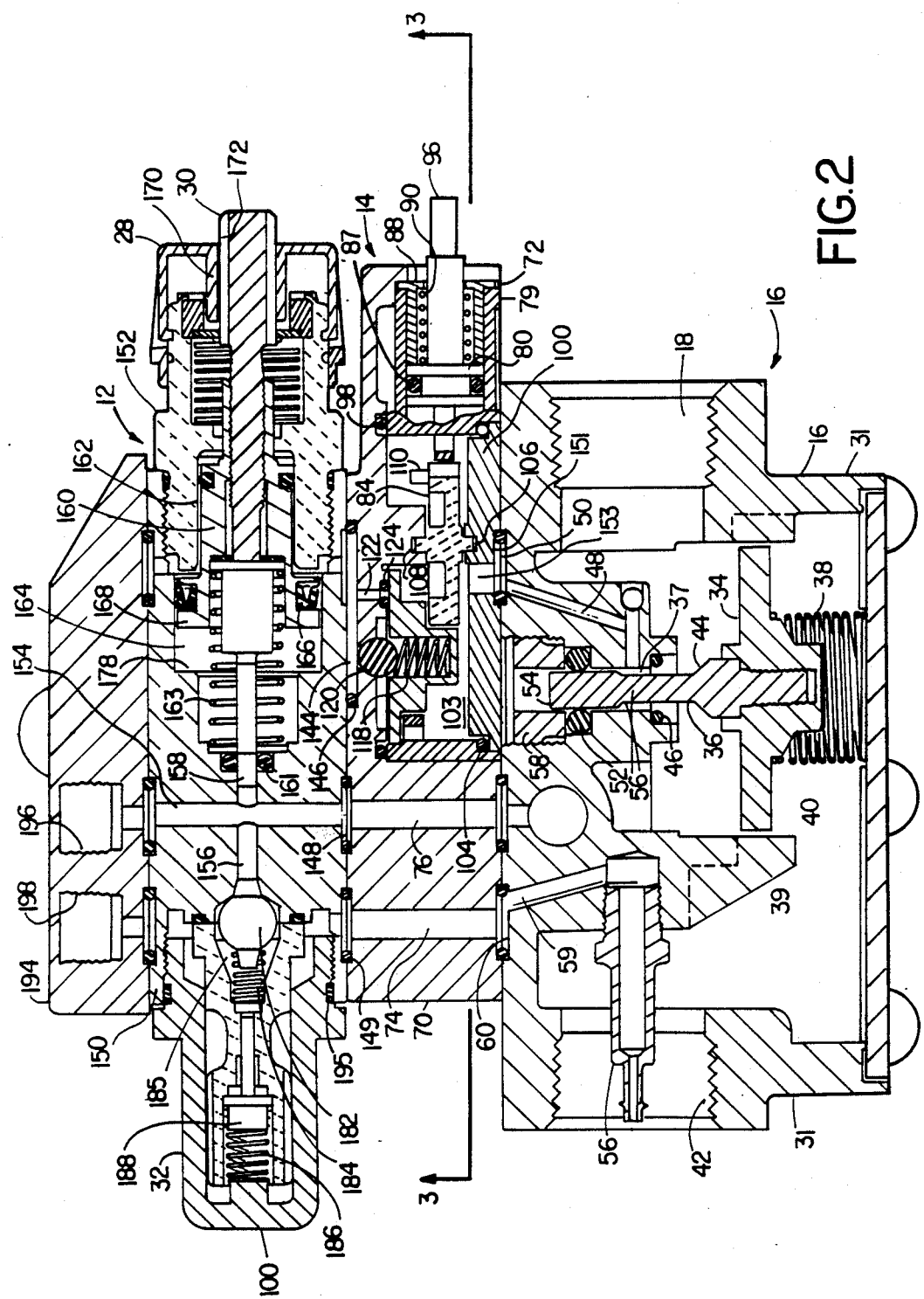

INJECTION LUBRICATOR WITH PULSE COUNTER

BACKGROUND OF THE INVENTION

The invention relates to a lubricator that provides a pulse of lubrication after counting a plurality of pneumatic pulses.

Injection lubricators are used to inject pulses of lubrication into equipment (e.g., air tools, cylinders, valves, etc.) upon receiving pneumatic pulses, which could be pneumatic pulses being supplied to drive the equipment being lubricated. The lubricators typically employ pistons that are driven by pneumatic pulses and have adjustable stroke lengths to adjust lubricant pulse volume. On some equipment, the minimum lubricant stroke volume setting results in delivery of more lubricant than is required for optimum operation and life of the device being lubricated, resulting in wasted lubricant. With some air tools, too much lubricant can have a deleterious effect on tool life.

Thrasher, Jr. et al. U.S. Pat. No. 4,324,316 discloses an injection lubricator that employs a counting mechanism to provide delivery of a pulse of lubricant after the occurrence of a fixed number (ten) of pneumatic pulses. Upon each pneumatic pulse, a piston moves to incrementally advance a rotating valve member 1/10 of a revolution via a ratchet and pawl mechanism. Once during each revolution of the valve member, a hole in the valve member lines up with an outlet that directs a pneumatic pulse to the lubricant injecting mechanism. To increase the number of pneumatic pulses per each lubricant pulse to 100, two counting mechanisms are provided in series.

SUMMARY OF THE INVENTION

In general, the invention features an injection lubricator having a pneumatically actuated lubricant pump, first and second rotatable counting members, and a counting piston that is pneumatically actuated. The counting piston causes an incremental rotation of the second rotatable counting member upon receiving each pneumatic pulse. The second rotatable counting member carries a displacement member that provides an incremental rotation of the first rotatable counting member after a plurality of incremental rotations of the second counting member have been caused by the counting piston. The first rotatable counting member provides a pneumatic pulse to the pup after a fixed number of incremental rotations of it. By using the first and second rotatable counting members to in effect multiply the counting of the pneumatic pulses, the device can achieve higher counts than can be achieved with a single rotatable member without the need to provide modules in series. Also the frequency of actuation can be varied over a wide range without changing the overall design by changing the frequency of actuation of one or both of the first and second rotatable counting members.

In preferred embodiments, the first and second rotatable counting members and counting piston are part of a pulse counting module, and the lubricant pump is a lubricant injection module that is connected to the pulse counting module. The second rotatable counting member has a plurality of displacement members. The first rotatable counting member has a plurality of holes. The second rotatable counting member is driven by the counting piston via a ratchet and pawl mechanism. The first counting member is driven by the second counting member via one or more posts on the second counting member and slots on the first counting member. There is a first resilient finger that locks in place in the slots of the first counting member after incremental rotations thereof. There is a second resilient finger that locks in place between ratchet teeth of the second counting member after incremental rotations thereof. The first and second counting members are in a pneumatic chamber to which the pneumatic pulses are communicated, and the counting piston communicates with the chamber. The pulse counting module has holes for the transport of lubricant therethrough. The module has a pressure release valve to bleed pressure after a stroke. Other advantages and features of the invention will be apparent from the following description of a preferred embodiment thereof and from the claims.

DESCRIPTION OF THE PREFERRED EMBODIMENTS

The preferred embodiment of the invention will now be described.

DRAWINGS

FIG. 1 is a diagrammatic, perspective view of an injection lubricator including a counting module according to the invention.

FIG. 2 is a vertical sectional view, taken at 2-2 of FIG. 1, of the FIG. 1 injection lubricator.

FIG. 3 is a horizontal sectional view, taken at 3-3 of FIG. 2, of the FIG. 1 counting module.

FIG. 4 is an exploded diagrammatic perspective view of rotatable counting member components of the FIG. 3 module.

STRUCTURE

Figure 5:
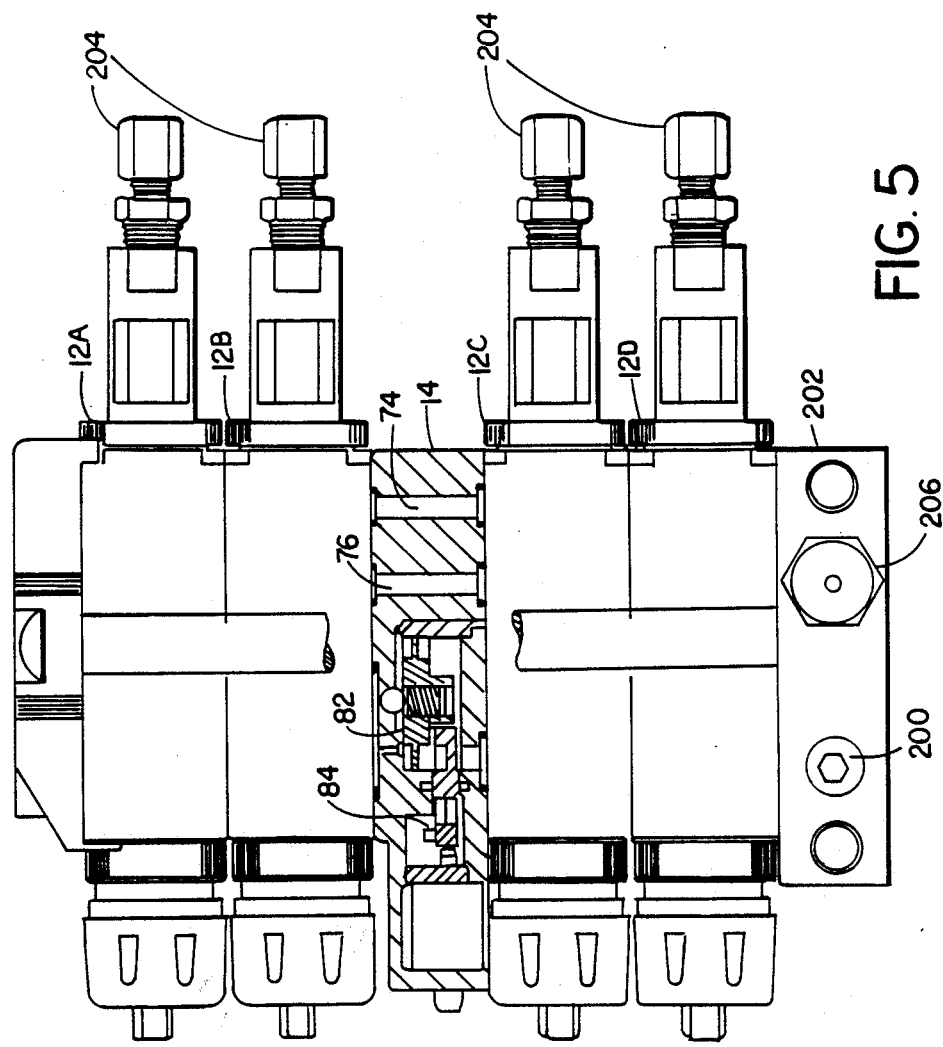
FIG. 5 is an elevation, partially in section, showing use of the pulse counting module in a different application.

Referring to FIG. 1, lubricant injection apparatus 10 includes injector module 12, pulse counting module 14, and sensor module 16. Lubricant injector module 12 and sensor module 16 are commercially available and are in the prior art. Sensor module 16 has threaded opening 18 to receive compressed air from a compressed air source (not shown) and an opening at the other end for making a threaded connection to coaxial hose 20 having an internal capillary oil line 22 within compressed air passage 24 thereof. Injector module 12 includes a lubricant piston therein that is actuated by pneumatic pulses to provide a pulse of lubricant to line 22. The lubricant is supplied from a source of lubricant to injection module 12 through opening 26 or opening 206. injector module 12 has knob 28 for adjusting the stroke length and thus stroke volume of its piston, which is connected to piston shaft 30, which extends from knob 28. Movement of shaft 30 indicates that a pulse of lubricant has been pumped. Injector module 12 also has a clear plastic end 32 surrounding a member to also provide an indication of pumping of lubricant by module 12. Counting module 14 includes a counting mechanism that counts pneumatic pulses used by equipment connected to tube 20 and delivers a pneumatic pulse to injector module 12 after a fixed number of pneumatic pulses has been received at opening 18.

Referring to FIG. 2, it is seen that sensor module 16 includes sensing plate 34, which communicates with opening 18 and is mounted on shaft 36 for sliding with respect to housing 31 of sensor module 16. Plate 34 is shown in an actuated, lower position in which spring 38 is compressed and air from opening 18 can pass beyond plate 34 under annular bottom rim 39 and between fins 40 to outlet 42. Shaft 36 includes a conical surface 44 that seals against O-ring 46 when spring 38 is extended. Housing 31 includes passage 48, which extends from central passage 37 to recessed opening 50 in the top surface of housing 31. Shaft 36 includes an enlarged end 54 that is sealed to housing 31 via O-ring 52 when in the depressed position shown in FIG. 2. A clearance exists between O-ring 52 and narrow portion 56 when shaft 36 is raised. Threaded cap 58 retains O-ring 52 and has a central passage that receives and guides shaft 36. Lubricant nozzle 56 is centered within outlet 42 and communicates with passage 59 leading to recess 60 in the upper surface of housing 31.

Referring to FIGS. 2, 3, and 4, counter module 14 includes housing 70 and subassembly 72 therein. Housing 70 includes vertical lubricant pulse passage 74 and vertical lubricant distribution passage 76. Passage 74 is used to convey a pulse of lubricant to passage 59 in sensor module 16. Passage 76 is used when a plurality of injection modules 12 are stacked, e.g., as in the FIG. 5 application.

Subassembly 72 fits within cavity 78 of housing 70, and includes retainer 79, which retains counting piston 80, first rotatable counting member 82, and second rotatable counting member 84. Counting piston 80 is received in cylindrical bore 86 of insert 79 and retained therein by cap 88. A piston chamber is provided by bore 86. Compression spring 90 within cap 88 biases counting piston 80 to the left. Counting piston 80 has a pawl extension 92 that engages ratchet teeth 94 on second rotatable member 84. Telltale shaft 96 extends outward from pulse counter module 14 to indicate movement of counting piston 80. O-ring 87 seals piston 80 to cylindrical bore 86. Sealing ring 98 seals insert 79 to housing 70. Bottom plate 100 seals off an opening to pneumatic chamber 102 in insert 79 via sealing ring 104. Bottom plate 100 has passage 153 to pneumatic chamber 102 and recess 151 surrounding passage 153 at the bottom surface.

Second rotatable counting member 84 has extensions 106 and 108 received in facing bores formed within cap 100 and the facing surface of housing 70 to provide rotatable mounting of second rotatable counting member 84. Extending upward from the upper surface of second rotatable counting member 84 is displacement member 110 (a post) that engages slots 112 of geneva wheel 114 of first rotatable counting member 82. First rotatable member 82 is received in a recess that corresponds to the shape of the outer periphery of the upper plate 116 of member 82 around the majority of the periphery. Compression spring 118 is within a central bore of rotatable member 82 and biases ball 120 upward against an opening to recess 144 to act as a pressure release valve. Passage 122 in housing 70 is sealed via O-ring 124 to the upper surface of plate 116 at a position that is in alignment with holes 126 through plate 116 at certain rotational positions of first counting member 82.

First resilient finger 128 is integral with retainer 79 and is used to provide unidirectional rotation of first counting member 82. Finger 128 has hooked end 130 that has a cam surface causing radially outward movement of it with initial incremental rotation of geneva wheel 114 and snapping into position to lock in a slot 112 with further incremental rotation to lock first counting member 82 into position. Insert 79 also has second integral resilient finger 132 to provide unidirectional rotation of second counting member 84. Second finger 132 has hooked end 134 that has a cam surface causing radially outward movement and snapping back into a locking position between ratchet teeth 94 after each incremental rotation of second counting member 84.

Housing 70 has ears 140 (FIG. 1) with holes 142 therethrough for receiving shafts (not shown) secured to top plate 194 (FIG. 2) on the FIG. 1 assembly to hold the assembly together. The upper surface of housing 70 includes an elongated recess 144 (FIG. 2) that is sealed to the bottom of injector module 12 via sealing ring 146. Recess 144 communicates with passage 122 and the passage sealed shut by check valve ball 120. The upper surface of housing 70 also includes circular recesses 148 and 149 that communicate with respective passages 76 and 74 and have respective sealing rings therein.

Referring to FIG. 2, injector module 12 includes central housing 150, to which are screwed clear plastic cap 32 at one end and adjustment housing 152 at the other end. Central housing 150 includes vertical lubricant supply passage 154 and transverse bore 156, which communicates with supply passage 154 and receives pumping piston end 158 of shaft 30. Shaft 30 is connected to slider 160 via adjustable threaded connection 174. Slider 160 has a smaller diameter portion received in bore 162 of adjustment housing 152 and larger diameter portion 168 sealably received in larger bore 164 of central housing 150. Piston end 158 is sealed to central housing 150 via O-ring 161. Piston shaft 30 is spring returned to a retracted position shown in FIG. 2 by compression spring 163. Sealing ring 166 seals enlarged portion 168 of slider 160 to bore 164 and defines, to its right, a pneumatic chamber that communicates with recess 144 of pulse counting module 14. Knob 28 has axial grooves adjacent to portions 170; these grooves mate with axial threads 172 of piston shaft 30. The axial position of piston end 158 is adjusted with respect to the axial position of enlarged portion 168 via threaded connection 174 between piston shaft 30 and slider 160; this thus defines the end of stroke position of piston end 158 within bore 156 when enlarged portion 168 is at its end of travel up against surface 178. Valve member 182 and spring 184 provide a check valve permitting flow of lubricant from passage 156 into cavity 185 and preventing reverse flow of lubricant. Cavity 185 leads to passage 186 within plastic cap 32. Telltale member 188 is within clear plastic cap 32 and provides a visual indication of pumping of a pulse of lubricant via piston end 158. Telltale member 188 is spring-returned via spring 190. Lubricant in chamber 186 communicates with lubricant pulse channel 74 within pulse counting module 14.

Top plate 194 is shown secured to the upper surface of injector module 12. Top plate 194 has a threaded connection 196 for making connection to a source of lubricant and threaded connection 198, which is not used in the particular injector module set-up shown in FIG. 2.

FIG. 5 shows use of pulse counting module 14 in a stack of four modules 12A, 12B, 12C, 12D that do not employ sensor module 16 but instead receive a pneumatic pulse at inlet 200 of bottom plate 202. Injection modules 12A, 12B, 12C, 12D are similar to injection module 12 but have lubricant outlets 204 that deliver lubricant pulses and do not have clear plastic ends 32 and passages to delivery recesses 195. A source of lubricant is connected to inlet 206, and lubricant is distributed to all injection modules 12A, 12B, 12C, 12D through passages 154 in injection modules 12A, 12B, 12C, 12D and passage 76 in pulse counting module 14.

OPERATION

In operation, compressed air is provided at opening 18 and fed through hose 20 to the equipment using the compressed air. Lubricant for use with the equipment is provided through capillary line 22 within hose 20. When the equipment using the compressed air fed through hose 20 opens a valve, the compressed air in hose 20 is supplied to the equipment, and the temporary reduction in air pressure at sensor module 16 causes a pneumatic pulse to be applied to pulse counting module 14. Upon counting a fixed number of pulses, pulse counting module 14 communicates a pneumatic pulse to injector module 12, which injects a pulse of lubricant to nozzle 56 and capillary line 22.

When the equipment is at rest, sensing plate 34 is in a raised position with the associated conical surface 44 sealing off passage 37 by sealing against sealing ring 46. When compressed air is used by the equipment, the resulting difference in pressure on opposite sides of sensing plate 34 causes it to move downward to the position shown in FIG. 2, permitting the flow of air underneath annular bottom rim 39 between fingers 40. At the same time, the downward movement of conical surface 44 opens passage 37 to passage 48; sealing ring 52 seals with enlarged end 54, and the increased air pressure is communicated to pneumatic chamber 102 within insert 79 of pulse counting module 14. The increase in pressure in pneumatic chamber 102 causes movement to the right of piston 80 so that pawl 92 is in the cocked position shown in FIG. 3.

When the demand for air by the equipment ends, flow through hose 20 ends; the pressures above and below sensing plate 34 become equal, and plate 34 rises, sealing off passages 37 and 48. At this time, narrow portion 56 is adjacent to sealing ring 52, permitting leakage of the above-atmospheric-pressure air in chamber 102 through the bore of cap 58 to the atmosphere outside of apparatus 10. When the air pressure in chamber 102 decreases, spring 90 biases piston 80 and pawl 92 to the left of the position shown in FIG. 3, causing an incremental rotation of second rotatable counting member 84. As second rotatable counting member 84 rotates, resilient finger 132 is biased outward, owing to a camming action, and hooked end 134 then locks into position at the next ratchet tooth 94 to lock second rotatable counting member 84 in its new position.

With each incremental rotation of second counting member 84 caused by application of a pneumatic pulse to the equipment being operated, displacement member 110 is moved a corresponding amount. Eventually displacement member 110 mates with a slot 112 in geneva wheel 114 and provides an incremental rotation of first rotatable counting member 82. The incremental rotation of first counting member 82 is provided in two steps that occur in two consecutive incremental rotations of second counting member 84 when displacement member 110 is within a slot 112. In the first step, hooked end 130 of resilient finger 128 is moved out of one slot 112 and engages a portion of geneva wheel 114 between slots. In the second step, hooked end 130 snaps into the next slot 112.

After a further complete rotation of second counting member 84, there is another incremental rotation of geneva wheel 114. Eventually a hole 126 in plate 116 is aligned with passage 122 upon the first step of an incremental rotation of first rotatable counting member 82. Because the step occurs with the spring return of piston 80, which occurs upon a decrease in pressure in chamber 102, there is no increase in pressure communicated to injector module 12 at this time. Then, with the next application of a pneumatic pulse, the increased pressure within chamber 102 is communicated through hole 126 and passage 122 to injector module 12. This causes displacement to the left of enlarged portion 168 and displacement to the left of piston end 158 within bore 156, opening check valve 182 and providing a pulse of lubricant through passage 74 in counting module 14 and into passage 59 in sensing module 16 and capillary line 22. When the air pressure in chamber 102 decreases, spring 90 biases piston 80 and pawl 92 to the left, causing an incremental rotation of second counting member 84 and the second step of incremental rotation of first counting member 82. In the second step, hole 126 is moved out of alignment with passage 122, and hooked end 130 of resilient finger 128 snaps into the next slot 112. Displacement member 110 thus moves plate 116 through two steps at the ends of two consecutive pneumatic pulses, one to align the hole 126 with passage 122 and another to move it beyond that position.

Bleeding of air from chamber 102 causes a difference in the pressure in chamber 102 and the pressure in recess 144. This pressure difference also appears on opposite sides of ball 120, and it causes ball 120 to move downward to permit communication of recess 144 with chamber 102 and relief of pressure.

Because there are two holes 126, two lubricant pulses are provided for each rotation of first counting member 82. Depending on the desired frequency of lubrication, different first counting members 82 and different second counting members 84 can be installed in a pulse counter module 14 without otherwise changing its design. First counting member 82 (which has 8 slots 112) can be provided with 1, 2, 4, or 8 holes, and second counting member 84 (which has 24 ratchet teeth 94) can be provided with 1 or 2 posts. By installing various combinations of first and second counting members, the frequency of injector actuation can be once in every 12, 24, 48, 96, or 192 cycles. Other frequencies can be obtained by adding additional posts to second counting member 84.

Use of two rotatable counting members in a single module permits obtaining a very high frequency of injector actuation and permits great flexibility in providing for various frequencies. In effect, the two rotatable counting members act as an internal multiplier. Also, the positioning of the pneumatic and lubricant holes in the upper and lower surfaces of pulse counter module 14 permits it to be used with standard modular injection lubricatr designs and also permits pulse counter module 14 to be stacked with a plurality of injector modules, as is shown in FIG. 5. In the FIG. 5 arrangement, pulse counting module 14 is used with four injector modules 12A, 12B, 12C, 12D. Instead of a sensor module 16, a source of pneumatic air is provided to inlet 200 to drive pumping of lubricant separate from or independent of any supply of pneumatic pulses to equipment. In the FIG. 5 arrangement, the pneumatic pulses being counted are provided directly from inlet 200 to recess 151 in bottom plate 100, and lubricant provided at inlet 200 is distributed to all injection modules 12A-D. Injector modules 12C and 12D, which are stacked below counting module 14, are provided with every pneumatic pulse, and injector modules 12A and 12B, which are stacked on top of counting module 14, are provided with pneumatic pulses only when pulse counting module 14 provides a pulse to them. More than one pulse counting module 14 could be provided at different locations in the stack to provide different frequencies of lubrication injection to different groups of injector modules 12.

Other embodiments of the invention are within the scope of the following claims.

What is claimed is:

1. An injection lubricator for providing a pulse of lubrication after counting a plurality of pneumatic pulses, said lubricator comprising
    a lubricant pump having a pumping piston actuated by a pneumatic pulse to deliver a pulse of lubricant to a lubricant delivery outlet,
    a first rotatable counting member that provides a pneumatic pulse to said pump after a fixed number of incremental rotations of said first rotatable counting member,
    a second rotatable counting member that carries a displacement member that provides an incremental rotation of said first rotatable counting member after a plurality of incremental rotations of said second rotatable counting member, and
    a counting piston that is mounted within a piston chamber to receive pneumatic pulses and to provide an incremental rotation of said second rotatable counting member upon receiving each pneumatic pulse.

2. The apparatus of claim 1 wherein said second rotatable counting member carries a plurality of displacement members.

3. The apparatus of claim 1 wherein said first rotatable counting member has a plurality of holes, each said hole directing a pneumatic pulse to said lubricant pump when in a particular rotational position, thereby providing more than one pneumatic pulse to said lubricant pump with each incremental rotation of said first rotatable counting member.

4. The apparatus of claim 1 wherein said counting piston carries a pawl, and said second rotatable counting member carries ratchet teeth that are engaged and incrementally moved by movements of said pawl.

5. The apparatus of claim 1 wherein said displacement member comprises a post carried by said second rotatable counting member, and said first rotatable counting member has slots that mate with said post when said post is moved to them.

6. The apparatus of claim 5 further comprising a first resilient finger that engages a said slot to lock said first rotatable counting member into place after an incremental rotation of said first rotatable counting member.

7. The apparatus of claim 4 further comprising a second resilient finger that engages a said ratchet tooth to lock said second rotatable counting member into place after an incremental rotation of said second counting member.

8. The apparatus of claim 1 further comprising means defining a pneumatic chamber which includes said piston chamber and in which said first and second rotatable counting members are located, said means having an opening to said pneumatic chamber, said opening communicating with a passage to said lubricant pump, said first rotatable counting member closing said opening at some rotational positions of said first rotatable counting member, sad first rotatable counting member having a hole through it that is aligned with said opening at another rotational positions of said first rotatable counting member, said pneumatic chamber communicating with said opening when said first rotatable counting member is at said another rotational position.

9. The apparatus of claim 8 further comprising an O-ring fixedly positioned with respect to said opening to provide a seal between said opening and said hole when they are aligned.

10. The apparatus of claim 8 wherein said means defining a chamber is part of a pulse counting module having a pneumatic pulse outlet communicating with said opening, and wherein said lubricant pump is part of a lubricant injection module that has a pneumatic pulse inlet, and wherein said pneumatic pulse outlet of said pulse counting module is aligned with said pneumatic pulse inlet of said injection module when said modules are stacked together.

11. The apparatus of claim 10 wherein said pulse counting module has a hole through it for transport of lubricant from one side of said pulse counting module to the other side of said pulse counting module.

12. The apparatus of claim 10 wherein said pulse counting module has a hole through it for transport of lubricant pulses from said delivery outlet of said lubricant injection module on one side of said pulse counting module to the other side of said pulse counting module.

13. The apparatus of claim 10 further comprising a pressure release valve permitting bleeding of air that is in said passage and is at a higher pressure than air in said pneumatic chamber to said pneumatic chamber.

14. The apparatus of claim 8 wherein said means defining a pneumatic chamber comprises a housing having a cavity therein, an insert that is mounted in said housing and seals to a surface of said housing and has a cavity therein, and wherein said first and second rotatable counting members are supported between and by said housing and said insert.

15. The apparatus of claim 14 wherein said insert includes a plate, and wherein said second rotatable counting member is supported by said plate.

16. A pneumatic pulse counting module for providing a pneumatic pulse to a pneumatically-actuated lubricant injection module after counting a plurality of pneumatic pulses, said pulse counting module comprising
    means defining a pneumatic chamber having a pneumatic pulse inlet for receiving pneumatic pulses being counted into said pneumatic chamber, a pneumatic pulse outlet for delivering a pneumatic pulse from said chamber to said lubricant injection module, and a piston chamber,
    a first rotatable counting member that is mounted within said pneumatic chamber and provides a path from said pneumatic chamber to said pneumatic pulse outlet after a fixed number of incremental rotations of said first rotatable counting member,
    a second rotatable counting member that is mounted within said pneumatic chamber and carries a displacement member that provides an incremental rotation of said first rotatable counting member after a plurality of incremental rotations of said second rotatable counting member, and
    a counting piston that is mounted within said piston chamber to receive pneumatic pulses and to provide an incremental rotation of said second rotatable counting member upon receiving each pneumatic pulse.

17. The module of claim 16 wherein said means defining a pneumatic chamber has an opening to said pneumatic chamber, said opening communicating with said pneumatic pulse outlet, said first rotatable counting member closing said opening at some rotational positions of said first rotatable counting member, said first rotatable counting member having a hole through it that is aligned with said opening at another rotational position of said first rotatable counting member, said pneumatic chamber communicating with said opening when said first rotatable counting member is at said another rotational position.

18. The module of claim 17 further comprising an O-ring fixedly positioned with respect to said opening to provide a seal between said opening and said hole when they are aligned.

19. The module of claim wherein said pulse counting module has a hole through it for transport of lubricant from one side of said pulse counting module to the other side of said pulse counting module.

20. The module of claim 16 wherein said pulse counting module has a hole through it for transport of lubricant pulses from a delivery outlet of said lubricant injection module on one side of said pulse counting module to the other side of said pulse counting module.

21. The module of claim 16 further comprising a pressure release valve permitting bleeding of air that communicates with said pneumatic pulse outlet and is at a higher pressure than air in said pneumatic chamber to said pneumatic chamber.

22. The module of claim 16 wherein said means defining a pneumatic chamber comprises a housing having a cavity therein, an insert that is mounted in said housing and seals to a surface of said housing and has a cavity therein, and wherein said first and second rotatable counting members are supported between and by said housing and said insert.

23. The module of claim 22 wherein said insert includes a plate, and wherein said second rotatable counting member is supported by said plate.

* * * * *

UNITED STATES PATENT AND TRADEMARK OFFICE
CERTIFICATE OF CORRECTION

PATENT NO. : 4,893,697
DATED : January 16, 1990
INVENTOR(S) : Robert B. Tosi

It is certified that error appears in the above-identified patent and that said Letters Patent is hereby corrected as shown below:

Col. 1, line 49, "pup" should be --pump--.

Col. 2, line 55, "injector" should be --Injector--. (Capitalize "I")

Col. 6, line 58, "lubricatr" should be --lubricator--.

In the claims:

Col. 8, line 3, "sad" should be --said--.

Col. 9, line 22, --16-- should be inserted after "claim".

Signed and Sealed this

Third Day of September, 1991

Attest:

HARRY F. MANBECK, JR.

Attesting Officer

Commissioner of Patents and Trademarks